(12) United States Patent
Zuro

(10) Patent No.: US 12,352,446 B2
(45) Date of Patent: Jul. 8, 2025

(54) RANGE HOOD ASSEMBLY WITH WIRELESS CAPABILITIES

(71) Applicant: ZLINE KITCHEN AND BATH, Reno, NV (US)

(72) Inventor: Andrew Zuro, Reno, NV (US)

(73) Assignee: ZLINE KITCHEN AND BATH, Reno, NV (US)

(*) Notice: Subject to any disclaimer, the term of this patent is extended or adjusted under 35 U.S.C. 154(b) by 602 days.

(21) Appl. No.: 17/767,533

(22) PCT Filed: Oct. 15, 2020

(86) PCT No.: PCT/US2020/055831
§ 371 (c)(1),
(2) Date: Apr. 8, 2022

(87) PCT Pub. No.: WO2021/076793
PCT Pub. Date: Apr. 22, 2021

(65) Prior Publication Data
US 2022/0412572 A1    Dec. 29, 2022

Related U.S. Application Data

(60) Provisional application No. 62/915,060, filed on Oct. 15, 2019.

(51) Int. Cl.
*F24C 15/20* (2006.01)
*G08C 17/02* (2006.01)
*H04R 1/02* (2006.01)

(52) U.S. Cl.
CPC ............ *F24C 15/20* (2013.01); *G08C 17/02* (2013.01); *H04R 1/02* (2013.01)

(58) Field of Classification Search
CPC ............ F24C 15/20; G08C 17/02; H04R 1/02
USPC ..................................... 126/299 D
See application file for complete search history.

(56) References Cited

U.S. PATENT DOCUMENTS

| 8,144,900 B2 | 3/2012 | Oxford |
| 2007/0089725 A1 | 4/2007 | Patarchi |
| 2016/0119699 A1* | 4/2016 | Caban .................... A45B 25/00 29/428 |

(Continued)

FOREIGN PATENT DOCUMENTS

| CN | 206556088 U | 10/2017 |
| CN | 206803279 U | 12/2017 |

(Continued)

OTHER PUBLICATIONS

Z-line (https://www.premiumhomesource.com/products/zline-48-stainless-steel-wall-range-hood-crown-molding-kbcrn-48#judgeme_product_reviews, earliest review is Jun. 21, 2018).*

(Continued)

*Primary Examiner* — Vivek K Shirsat
(74) *Attorney, Agent, or Firm* — Dickinson Wright PLLC

(57) ABSTRACT

A range hood assembly includes a hood stack with crown molding attached to and bordering a top end of the hood stack. A speaker assembly is located within the crown molding. A wireless communication device is connected to the speaker assembly for receiving digital input signals from wireless communication enabled digital devices for controlling the speaker assembly and other devices associated with the range hood assembly.

15 Claims, 4 Drawing Sheets

(56) References Cited

U.S. PATENT DOCUMENTS

2018/0171645 A1\* 6/2018 Lane .................. E04F 19/022
2018/0372332 A1 12/2018 Cha et al.

FOREIGN PATENT DOCUMENTS

| DE | 102015103527 A1 | 9/2016 |
| JP | 2005337584 A | 12/2005 |
| TM | M536735 U | 2/2017 |

OTHER PUBLICATIONS

Unknown, "Crown Sound—Installation Guide and Users Manual" (ZLINE), 11 pages (Last Accessed Apr. 7, 2022 at: https://assets.ajmadison.com/ajmadison/itemdocs/Crown_Sound_User_Manual_and_Install_Guide_Apr_2020_-_WEB.pdf).
Unknown, "Professional Stainless 655—ZLINE Kitchen," 11 pages (Last Accessed Apr. 7, 2022 at: https://web.archive.org/web/20190911190026/http://www.zlinekitchen.com:80/professional-stainless-655).

\* cited by examiner

RANGE HOOD ASSEMBLY WITH WIRELESS CAPABILITIES

CROSS-REFERENCE TO RELATED APPLICATIONS

This U.S. National Stage Patent application claims the benefit of and priority to International Patent Application No. PCT/US2020/055831 filed Oct. 15, 2020, which claims benefit of U.S. Provisional Patent Application Ser. No. 62/915,060, filed on Oct. 15, 2019 and titled "A Range Hood Assembly with Wireless Capabilities" the entire disclosure of which is hereby incorporated by reference.

TECHNICAL FIELD

The present disclosure relates to the field of smart home technology. More particularly, the present disclosure relates to a range hood assembly having wireless control capabilities.

BACKGROUND

Smart home devices, such as lights, thermostats, locks and audio systems have become increasingly popular. It is known to control such smart home devices with portable devices such as cell phones, tablets, etc. via a wireless connection to provide convenient use of the smart home devices. There remains a continued need for improvements to such smart home devices.

SUMMARY OF THE INVENTION

According to an aspect of the disclosure, a range hood assembly is provided. The range hood assembly includes a hood stack, a crown molding attached around a top end of the hood stack, a speaker located within the crown molding. The crown molding defines a cutout for transmitting sound from the speaker.

According to another aspect of the disclosure, a range hood includes a hood stack, an exhaust fan, one or more lights, and a wireless communication device for receiving digital signals from one or more remote devices. The wireless communication device is in functional communication with the exhaust fan and the one or more lights for controlling operation thereof.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
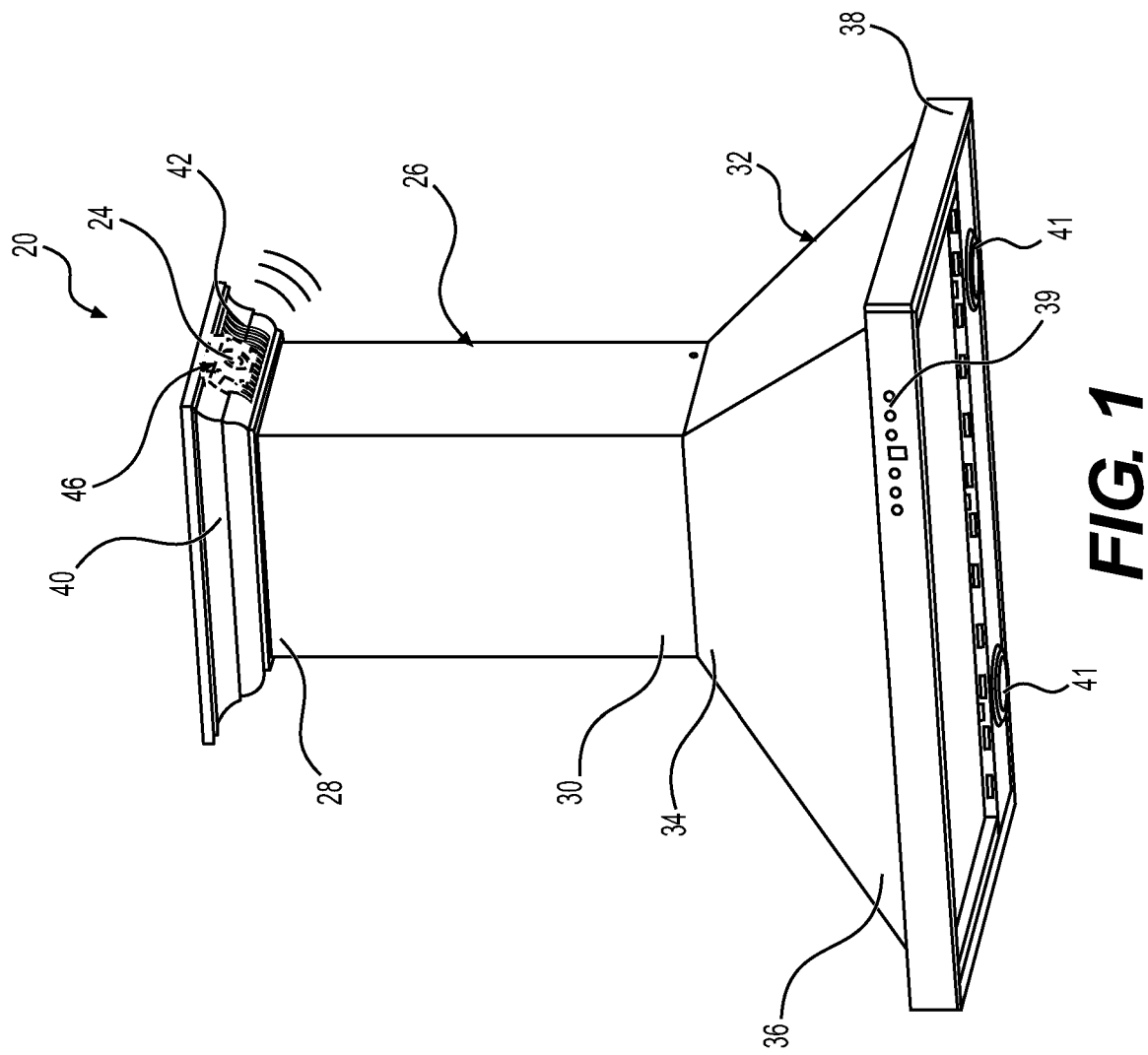
FIG. 1 is a perspective view of an example embodiment of a range hood assembly according to an aspect of the disclosure.

Referring to the figures, wherein like numerals indicate corresponding parts throughout the several views, a range hood assembly 20 is generally shown. The range hood assembly 20 is configured to hang above a stove or cooktop and includes an exhaust fan and one or more filters for removing contaminants, such as airborne grease, fumes, smoke, heat, and steam, from the air.

The range hood assembly of the present disclosure may provide several advantages, including providing a discretely located speaker assembly, such that unsightly speakers are not visible in a user's kitchen. Furthermore, the wireless communication device of the subject assembly allows users to conveniently control the speaker assembly and other features of the hood stack, e.g., lights and an exhaust fan via portable device and/or voice controls.

The range hood assembly 20 generally includes a hood stack 26 extending between a top end 28 and a bottom end 30, and a hood skirt 32 defined by a top edge 34 and a bottom edge 36. It should be appreciated that as used herein, the terms "edge" and "end" may encompass the general top and bottom regions (not just terminal ends). One or more lights 41 are located within the hood skirt 32. The lights 41 may function as task lighting to illuminate an area below the range hood assembly 20, such as a cooktop surface. Additionally or alternatively, the lights 41 may function as decorative or as general space lighting. The top edge 34 of the hood skirt 32 is narrower than the bottom edge 36 and mates to the bottom end 30 of the hood stack 26. An outer frame 38 is attached to and surrounds the bottom edge 36 of the hood skirt 32. The outer frame 38 houses a set of controls 39 for controlling the exhaust fan and for controlling the lights 41. The controls 39 may include one or more buttons, switches, knobs, a touch screen, etc. The controls 39 may include on/off control of the exhaust fan and/or the lights 41. Alternatively or additionally, the controls 39 may provide for multiple different speed settings for the exhaust fan, and/or multiple different brightness settings for the lights 41.

As shown in FIG. 1, a crown molding 40 is attached to and disposed around the top end 28 of the hood stack 26. The crown molding 40 may completely surround the top end 28 of the hood stack 26. Alternatively, the crown molding 40 may only partially surround the top end 28 of the hood stack 26, for example, where the hood stack 26 is located against a wall. The crown molding 40 contains a cutout 42 for transmitting sound from one or more speakers 24, with the speakers 24 located within the crown molding 40. According to an aspect of the disclosure, the cutout 42 may also serve as a vent when used in conjunction with a recirculating hood such that it expels filtered air drawn in through the hood skirt 32. For example, the speakers 24 may each be located in a space that is partially or entirely enclosed by the crown molding 40. In some embodiments, all or part of a speaker 24 may be recessed within a piece of the crown molding 40, with the speaker 24 recessed behind an outward-facing surface of the crown molding 40. The cutout 42 may include a plurality of parallel slots. Alternatively or additionally, the cutout 42 may have a covering of sound-transmissive material, such as a fabric, that visually blends with the surrounding area of the crown molding 40, but which freely transmits sound. It should be appreciated that the discretely located speakers 24 in the crown molding 40 provides audio in a kitchen setting without unsightly speakers being present in a user's field of vision. In some embodiments (not shown in FIG. 1), the speakers 24 are mounted to other structure within the hood stack 26 with a bracket assembly 44. The bracket assembly 44 may hold a speaker assembly 46, which contains the speakers 24 and other associated devices for playing music and other forms of entertainment while a user is in the kitchen working. According to another aspect of the disclosure, the crown 40 installs onto crown bracket/mounting lip 64 (discussed below) without the need for fasteners as the crown 40 slides on top of crown bracket or mounting lip 64 and is compressed between the crown bracket 64 and the ceiling where the crown bracket 64 has been fastened to the ceiling through fastening holes 72 as well as mounting holes 66 and to the wall with mounting holes 68.

Figure 2:
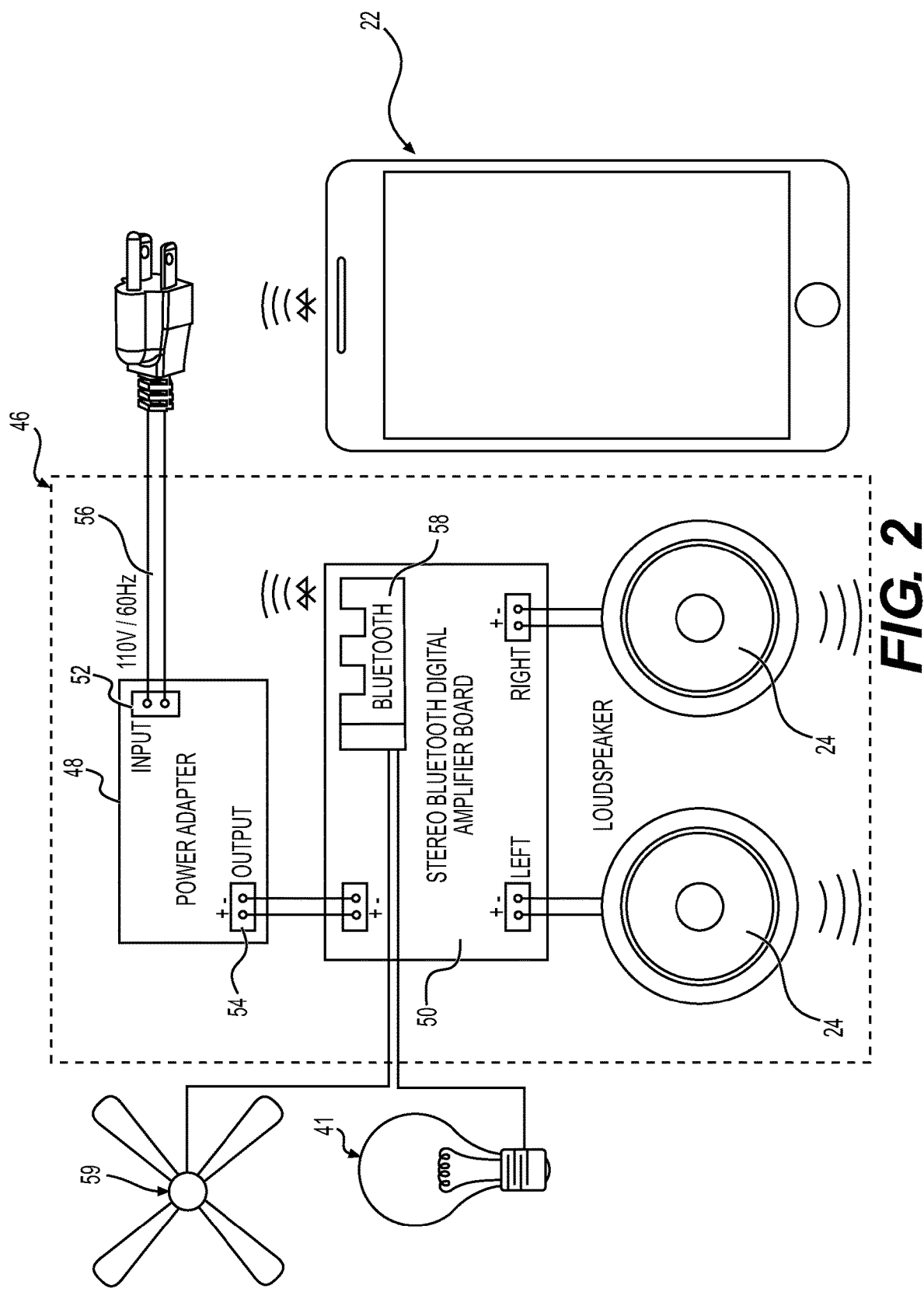
FIG. 2 is a schematic diagram showing components of a speaker assembly of the range hood assembly.

FIG. 2 is a schematic diagram showing components of the speaker assembly 46 in accordance with an aspect of the present disclosure. The speaker assembly 46 includes a power adapter 48 having an input 52 and an output 54, and with the input 52 connected to a power cord 56 of 110v and 60 Hz, and the output 54 connected to the amplifier board 50. The power adapter 48 may provide a low-voltage DC power on the output 54 using an AC input power supplied to the input 52. The speaker assembly 46 also includes an amplifier board 50 connected to the speakers 24 for amplifying an electrical signal representing sound to be produced by the speakers 24. It should be appreciated that these are merely examples, and the power cord 56 may have other configurations, such as for European or other utility power standards, or for low-voltage DC power, for use in a vehicle such as a boat or a recreational vehicle.

The amplifier board 50 is outfitted with a wireless communication device 58, such as a Bluetooth® transceiver microchip, for receiving digital signals from one or more remote devices 22 having wireless communication capabilities. The wireless communication device 58 may receive a digitized audio signal, which may include one or more audio channels (e.g. left and right channels of a music recording). The wireless communication device 58 may be configured to convert the digitized audio signal to an analog electrical signal representing sound representing sound to be produced by the speakers 24. In some embodiments, the electrical signal from the wireless communication device 58 may be amplified by other circuitry in the amplifier board 50 before it is transmitted to the speakers 24.

The remote devices 22, may include, for example, a computer, smartphone, personal digital assistant (PDA), a vehicle infotainment system, a video game console, a smart home controller or hub, etc. The remote devices 22 may include a voice-activated audio or audiovisual device, such as a device equipped with a voice-activated digital assistant, such as Google Home™ or Alexa™ by Amazon, for receiving voice commands. Such a remote device 22 may allow a user to control audio signals, such as music, played by the speakers 24. The wireless communication device 58 may be in functional communication with the amplifier board 50, which may control power and other settings, such as volume level. The wireless communication device 58 is in functional communication with the exhaust fan 59, lights 41 for controlling their operation. These are merely examples, and the wireless communication device 58 may be in functional communication with other devices as well. This connection may allow the devices of the range hood assembly 20 to be remotely controlled. The wireless communication device 58 may further include one or more microphones for receiving voice commands for controlling the devices.

Figure 3:
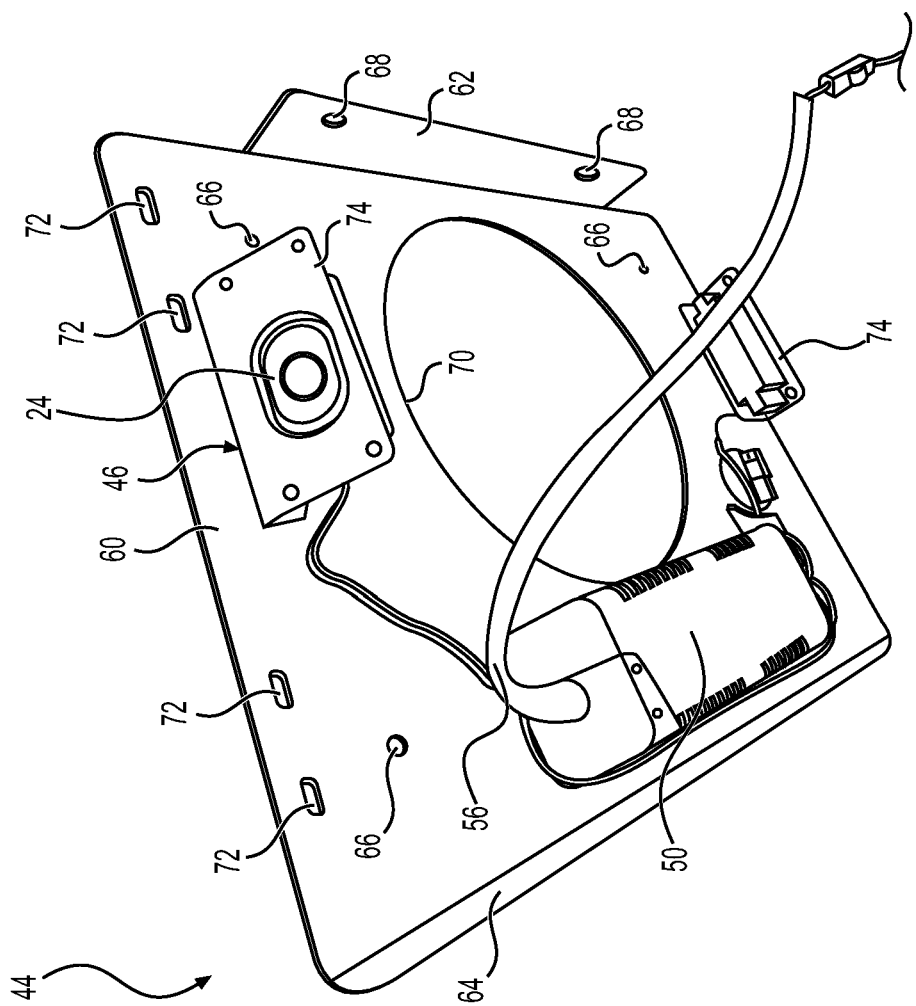
FIG. 3 is a front perspective view of a bracket and the speaker assembly.
Figure 4:
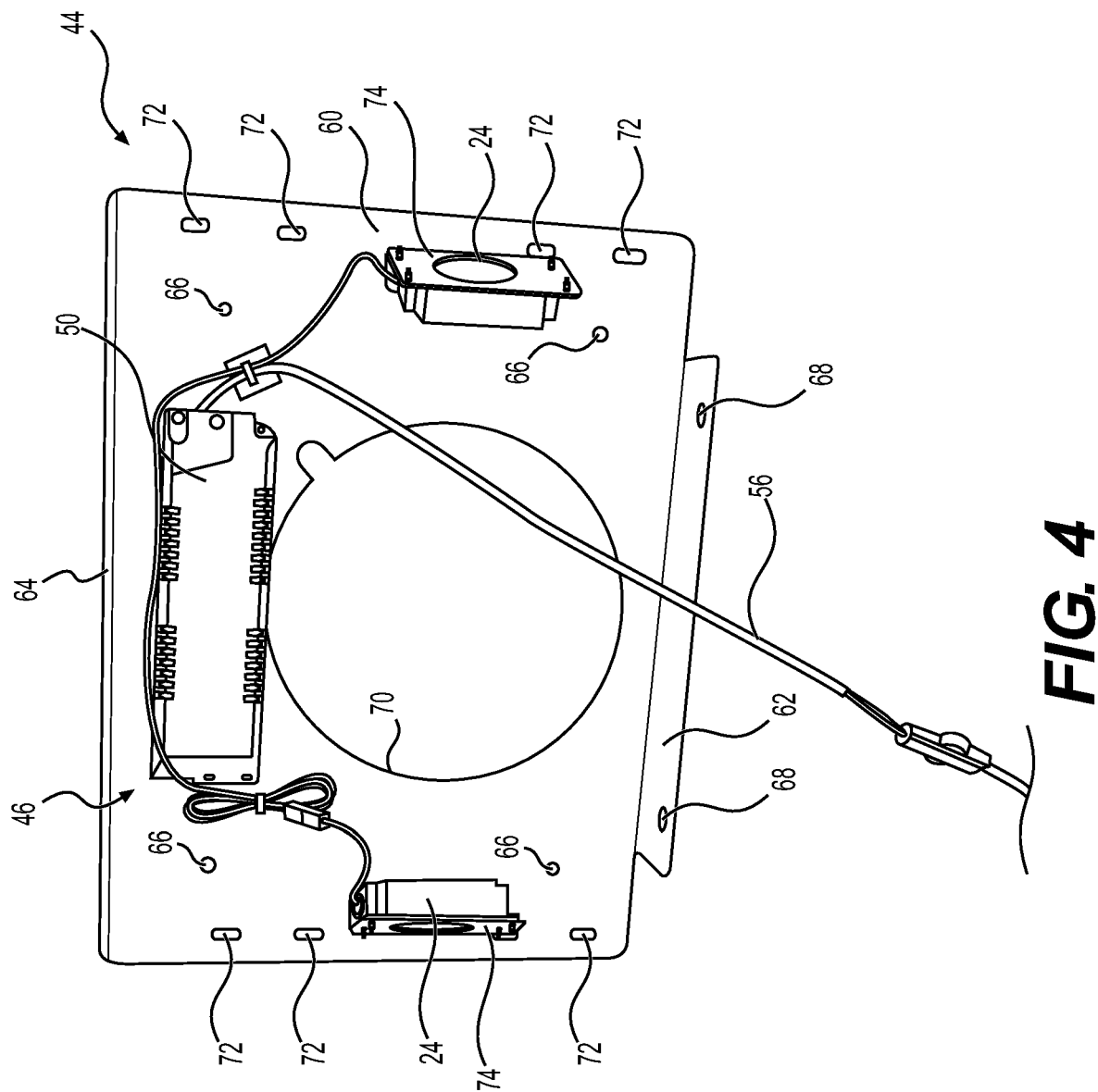
FIG. 4 is a rear perspective view of the bracket and speaker assembly.

Components of the speaker assembly 46, shown in FIG. 2-4, consist of a power adapter 48, an amplifier board 50 and one or more speakers 24. The speakers 24 may be situated side-by-side in the crown molding 40. Alternatively, the speakers 24 may have other arrangements in the crown molding 40. For example, a corresponding one of the speakers may be mounted on each of the left and the right sides of the crown molding 40. In some embodiments, one or more speakers 24 may be configured to transmit sound through a front-facing side of the crown molding 40. The bracket assembly 44 can vary in size depending on the quantity and size of the speakers 24. Also, more than one cutout 42 and bracket assemblies 44 can be added to the crown molding 40 for additional speakers 24 or other items the user may want to mount, such as, a monitor or television or video camera.

An example bracket assembly 44 is shown in FIG. 3. As shown in FIG. 3, the bracket assembly 44 includes a main plate 60 configured to be mounted a ceiling and/or a wall and configured to hold the speaker assembly 46. The bracket assembly 44 includes a wall plate 62 for mounting the bracket assembly 44 to a wall. The wall plate 62 may be integrally formed with the main plate 60, e.g. as a single piece of sheet metal that is bent at a 90-degree angle. The bracket assembly 44 also includes a mounting lip 64 on an opposite edge from the wall plate 62. The mounting lip 64 may be integrally formed with the main plate 60, e.g. as a single piece of sheet metal that is bent at an angle, such as a 45-degee angle. The mounting lip 64 may be used to attach the hood stack 26 and/or the crown molding 40 to the wall and/or the ceiling. In some embodiments, there may be no fasteners, or at least no visible fasteners holding the hood stack 26 and/or the crown molding 40 to the wall and/or the ceiling. For example, the hood stack 26 and the crown molding 40 may only be fixed to the ceiling and/or an upper region of the wall by hanging from the mounting lip 64. Alternatively, one or more hidden fasteners, such as spring clips, may hold the hood stack 26 and/or the crown molding 40 to the bracket assembly 44.

The main plate 60 includes a plurality of first mounting holes 66 for attaching the bracket assembly 44 to the ceiling or another structure above the range hood assembly 20. The wall plate 62 includes a plurality of second mounting holes 68 for attaching the bracket assembly 44 to a wall or another structure behind the range hood assembly 20. The main plate 60 defines an exhaust hole 70 for accommodating an exhaust duct to convey exhaust gasses therethrough. The main plate 60 also includes a plurality of fastening holes 72 for allowing the main plate to be secured to the ceiling. The main plate 60 may also include one or more protrusions, which may be formed into the main plate to cause the main plate 60 to be spaced a small distance away from the ceiling. Additionally or alternatively, the protrusions may provide the main plate 60 with structural rigidity.

The bracket assembly 44 also includes a plurality of speaker brackets 74 attached to the main plate 60, with each of the speaker brackets 74 holding one or more speakers 24. The speaker brackets 74 may hold the speakers 24 at an angle, such as a 45-degree angle or a 60-degree angle to the main plate 60 for orienting the one or more speakers 24 outwardly and downwardly to project sound out of the crown molding 40.

According to an aspect of the disclosure, a range hood assembly comprises: a hood stack; a crown molding attached around a top end of the hood stack; a speaker located within the crown molding; and the crown molding defining a cutout for transmitting sound from the speaker.

According to an aspect of the disclosure, the cutout includes a plurality of parallel slots.

According to an aspect of the disclosure, the cutout includes a covering sound-transmissive material.

According to an aspect of the disclosure, the range hood assembly further comprises: an amplifier board connected to the speaker for amplifying an electrical signal representing sound to be produced by the speaker; and a power adapter having an input and an output connected to the amplifier board, the power adapter configured to provide a low-voltage DC power on the output using an AC input power supplied to the input.

According to an aspect of the disclosure, the range hood assembly further comprises: a wireless communication device connected to the speaker, the wireless communication device configured to receive digital signals from one or more remote devices and to convert a digitized audio signal to an analog electrical signal representing sound to be produced by the speaker.

According to an aspect of the disclosure, the wireless communication device further includes one or more microphones for receiving voice commands for controlling at least one of an amplifier board, an exhaust fan, or a light.

According to an aspect of the disclosure, the range hood assembly further comprises: an amplifier board connected to the speaker for amplifying an electrical signal representing sound to be produced by the speaker; a wireless communication device configured to receive digital signals from one or more remote devices and to convert a digitized audio signal to an analog electrical signal representing sound to be produced by the speaker; and the wireless communication device is in functional communication with the amplifier board for controlling at least one of a power setting or a volume level setting of the amplifier board.

According to an aspect of the disclosure, the range hood assembly further comprises: an exhaust fan; one or more lights; and a wireless communication device for receiving digital signals from one or more remote devices; wherein the wireless communication device is in functional communication with at least one of the exhaust fan or the one or more lights for controlling operation thereof. It should be appreciated that the fan may include one or more motors.

According to an aspect of the disclosure, the speaker is one of a plurality of speakers; and at least one of the plurality of speakers is configured to transmit sound through a front-facing side of the crown molding.

According to an aspect of the disclosure, the speaker is one of a plurality of speakers; and the plurality of speakers are arranged with ones of the plurality of speakers located in each of a left side of the crown molding and a right side of the crown molding.

According to an aspect of the disclosure, the speaker is one of a plurality of speakers; and the plurality of speakers are arranged with ones of the plurality of speakers located in each of a left side of the crown molding and a right side of the crown molding.

According to an aspect of the disclosure, the range hood assembly further comprises: a bracket assembly including a main plate configured to be mounted a ceiling and/or a wall; and the bracket assembly includes speaker brackets attached to the main plate and holding the speaker at an angle to the main plate for orienting the speaker outwardly and downwardly to project sound out of the crown molding.

According to an aspect of the disclosure, the bracket assembly further includes a wall plate integrally formed with the main plate and configured for mounting the bracket assembly to the wall.

According to an aspect of the disclosure, the bracket assembly further includes a mounting lip integrally formed with the main plate and extending along an edge thereof, the mounting lip configured for attachment of one or more of the hood stack or the crown molding. It should be appreciated that the mounting lip may allow for the crown to be installed without additional fasteners.

According to an aspect of the disclosure, a range hood assembly is provided. The range hood comprises: a hood stack; an exhaust fan; one or more lights; a wireless communication device for receiving digital signals from one or more remote devices. The wireless communication device is in functional communication with the exhaust fan and the one or more lights for controlling operation thereof.

According to an aspect of the disclosure, the range hood assembly further comprises: a crown molding attached to and disposed around a top end of the hood stack, with one or more speakers located within the crown molding; and the wireless communication device is configured to convert a digitized audio signal to an analog electrical signal representing sound to be produced by the speaker.

According to an aspect of the disclosure, the range hood assembly further comprises: an amplifier board connected to the speaker for amplifying an electrical signal representing sound to be produced by the speaker; and the wireless communication device is in functional communication with the amplifier board controlling at least one of a power setting or a volume level setting thereof.

According to an aspect of the disclosure, the wireless communication device further includes one or more microphones for receiving voice commands for controlling at least one of the exhaust fan, or the one or more lights.

According to an aspect of the disclosure, the range hood assembly further comprises: one or more speakers; and the wireless communication device is further configured to convert a digitized audio signal to an electrical signal representing sound to be produced by the one or more speakers.

According to another aspect of the disclosure, the subject range hood assembly 20 may be adapted such that it is configured to overly a kitchen island. According to this embodiment, the bracket assembly may be constructed such that it can be installed without support of a wall. According to this embodiment, the crown may have be of two-piece that unite (e.g., clip together) at a central location. This embodiment may also be installed without additional fasteners and may also conceal speakers within the crown.

According to another aspect of the disclosure, all smart control features may be built into the hood itself with outputs to allow the attachment of a speaker wire that will run to the crown bracket. Alternatively, the speakers may be wireless. Main controls within the hood may be configured to control speaker function as well as lights and fans.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A range hood assembly comprising:
   a hood stack;
   a crown molding attached around a top end of the hood stack;
   a speaker located within the crown molding;
   the crown molding defining a cutout for transmitting sound from the speaker; and
   a wireless communication device connected to the speaker, the wireless communication device configured to receive digital signals from one or more remote devices and to convert a digitized audio signal to an analog electrical signal representing sound to be produced by the speaker;
   wherein the wireless communication device further includes one or more microphones for receiving voice commands for controlling at least one of an amplifier board, an exhaust fan, or a light.

2. The range hood assembly of claim 1, wherein the cutout includes a plurality of parallel slots.

3. The range hood assembly of claim 1, wherein the cutout includes a covering of a sound-transmissive material.

4. The range hood assembly of claim 1, wherein the microphones of the wireless communication device receive commands for controlling the amplifier board, and wherein the amplifier board is connected to the speaker for amplifying an electrical signal representing sound to be produced by the speaker; and further including a power adapter having an input and an output connected to the amplifier board, the power adapter configured to provide a low-voltage DC power on the output using an AC input power supplied to the input.

5. The range hood assembly of claim 1, wherein the microphones of the wireless communication device receive commands for controlling the amplifier board, and wherein the amplifier board is connected to the speaker for amplifying an electrical signal representing sound to be produced by the speaker; and wherein the wireless communication device is in functional communication with the amplifier board for controlling at least one of a power setting or a volume level setting of the amplifier board.

6. The range hood assembly of claim 1, wherein the microphones of the wireless communication device receive commands for controlling the exhaust fan and the light.

7. The range hood assembly of claim 1, wherein the speaker is one of
a plurality of speakers; and
wherein at least one of the plurality of speakers is configured to transmit sound through a front-facing side of the crown molding.

8. The range hood assembly of claim 1, wherein the speaker is one of a plurality
of speakers; and
wherein the plurality of speakers are arranged with ones of the plurality of speakers located in each of a left side of the crown molding and a right side of the crown molding.

9. A range hood assembly comprising:
a hood stack;
a crown molding attached around a top end of the hood stack;
a speaker located within the crown molding;
the crown molding defining a cutout for transmitting sound from the speaker;
a bracket assembly including a main plate configured to be mounted to a ceiling and/or a wall; and
the bracket assembly including speaker brackets attached to the main plate and holding the speaker at an angle relative to the main plate for orienting the speaker outwardly and downwardly to project sound out of the crown molding.

10. The range hood assembly of claim 9, wherein the bracket assembly further includes a wall plate integrally formed with the main plate and configured for mounting the bracket assembly to the wall.

11. The range hood assembly of claim 9, wherein the bracket assembly further includes a mounting lip integrally formed with the main plate and extending along an edge thereof, the mounting lip configured for attachment of one or more of the hood stack or the crown molding.

12. A range hood assembly comprising:
a hood stack;
an exhaust fan;
one or more lights;
a wireless communication device for receiving digital signals from one or more remote devices, wherein the wireless communication device is in functional communication with the exhaust fan and the one or more lights for controlling operation thereof;
a crown molding attached to and disposed around a top end of the hood stack, with one or more speakers located within the crown molding; and
wherein the wireless communication device is configured to convert a digitized audio signal to an analog electrical signal representing sound to be produced by the speaker.

13. The range hood assembly of claim 12, further comprising:
an amplifier board connected to the one or more speakers for amplifying an electrical signal representing sound to be produced by the one or more speakers; and
wherein the wireless communication device is in functional communication with the amplifier board controlling at least one of a power setting or a volume level setting thereof.

14. The range hood assembly of claim 12, wherein the wireless communication device further includes one or more microphones for receiving voice commands for controlling at least one of the exhaust fan, or the one or more lights.

15. A range hood assembly configured to hang above a stove or cooktop and comprising:
an exhaust fan and one or more filters;
a hood stack extending between a top end and a bottom end;
a hood skirt extending between a bottom edge and a narrower top edge, with the narrower top edge mating to the bottom end of the hood stack, and with an outer frame attached to and surrounding the bottom edge;
one or more lights located within the hood skirt;
a set of controls mounted to the outer frame for controlling the exhaust fan and for controlling the one or more lights, the set of controls including at least one of: on/off control of the exhaust fan or the one or more lights, or multiple different speed settings for the exhaust fan, or multiple different brightness settings for the one or more lights;
a crown molding attached to and disposed around the top end of the hood stack;
a plurality of speakers located within the crown molding;
the crown molding defining a cutout for transmitting sound from the plurality of speakers, the cutout having a plurality of parallel slots and/or a covering of a sound-transmissive material;
wherein the plurality of speakers are arranged in one of: a side-by-side arrangement in the crown molding, or with one of the plurality of speakers located in each of a left side of the crown molding and a right side of the crown molding, or with a speaker of the plurality of speakers configured to transmit sound through a front-facing side of the crown molding;
a speaker assembly including an amplifier board connected to the plurality of speakers for amplifying an electrical signal representing sound to be produced by the plurality of speakers;
the speaker assembly including a power adapter having an input and an output, with the input connected to a power cord of 110v and 60 Hz, and the output connected to the amplifier board, the power adapter configured to provide a low-voltage DC power on the output using an AC input power supplied to the input;

the amplifier board including a wireless communication device configured to receive digital signals from one or more remote devices, the wireless communication device configured to convert a digitized audio signal to the electrical signal representing sound to be produced by the plurality of speakers;

wherein the wireless communication device is in functional communication with the amplifier board for controlling power and volume level settings;

the wireless communication device further including one or more microphones for receiving voice commands for controlling the amplifier board;

a bracket assembly for mounting the plurality of speakers to the hood stack, the bracket assembly including a speaker bracket containing the plurality of speakers, the bracket assembly including a main plate configured to be mounted to a ceiling and/or a wall and configured to hold the speaker bracket, the main plate defining an exhaust hole for accommodating an exhaust duct, and the main plate defining a plurality of protrusions;

the bracket assembly including a wall plate extending from the main plate and configured for mounting the bracket assembly to the wall;

the bracket assembly including a mounting lip extending from the main plate and extending along an edge parallel to and spaced away from the wall plate, the mounting lip configured for attachment of one or more of the hood stack or the crown molding;

each of the speaker brackets configured to hold the speakers at an angle to the main plate for orienting the speakers outwardly and downwardly to project sound out of the crown molding.

* * * * *